US012486718B2

(12) United States Patent
Blankchtein

(10) Patent No.: US 12,486,718 B2
(45) Date of Patent: Dec. 2, 2025

(54) ASSAULT LADDER SYSTEM, METHOD AND DEVICE

(71) Applicant: Tzviel Blankchtein, Severna Park, MD (US)

(72) Inventor: Tzviel Blankchtein, Severna Park, MD (US)

( * ) Notice: Subject to any disclaimer, the term of this patent is extended or adjusted under 35 U.S.C. 154(b) by 473 days.

(21) Appl. No.: 18/087,670

(22) Filed: Dec. 22, 2022

(65) Prior Publication Data

US 2023/0212911 A1 Jul. 6, 2023

Related U.S. Application Data

(60) Provisional application No. 63/296,701, filed on Jan. 5, 2022.

(51) Int. Cl.

| | |
|---|---|
| ***E06C 1/10*** | (2006.01) |
| ***E06C 1/36*** | (2006.01) |
| ***E06C 1/38*** | (2006.01) |
| ***E06C 7/48*** | (2006.01) |

(52) U.S. Cl.

CPC .................. *E06C 1/10* (2013.01); *E06C 1/36* (2013.01); *E06C 1/381* (2013.01); *E06C 7/48* (2013.01); *E06C 7/484* (2013.01)

(58) Field of Classification Search

CPC . E06C 1/381; E06C 1/383; E06C 1/36; E06C 7/484

See application file for complete search history.

(56) References Cited

U.S. PATENT DOCUMENTS

| | | | | |
|---|---|---|---|---|
| 3,078,953 A * | 2/1963 | Silen | E06C 1/52 | 182/163 |
| 2002/0108811 A1* | 8/2002 | Ulmschneider | E06C 7/482 | 182/206 |
| 2008/0196972 A1* | 8/2008 | Bell | E06C 1/58 | 182/136 |

FOREIGN PATENT DOCUMENTS

| | | | |
|---|---|---|---|
| CN | 202039763 U * | 11/2011 | |
| CN | 204371089 U * | 6/2015 | |
| SE | 527897 C2 * | 7/2006 | B60R 3/007 |

* cited by examiner

*Primary Examiner* — Christopher D Hutchens

(57) ABSTRACT

An assault ladder system, method and device for scaling objects while breaching glass windows. The assault ladder includes a ladder frame having one or more top grappling hooks for hooking onto a ledge as well as one or more window breaker rods for breaking any glass blocking a path at the top of the ladder.

7 Claims, 3 Drawing Sheets

ASSAULT LADDER SYSTEM, METHOD AND DEVICE

CROSS-REFERENCE TO RELATED APPLICATIONS

This application claims priority to U.S. Provisional Application Ser. No. 63/296701, filed Jan. 5, 2022, titled "ASSAULT LADDER SYSTEM, METHOD AND DEVICE", hereby incorporated by reference in its entirety for all of its teachings.

FIELD OF THE INVENTION

The invention relates to ladders. In particular, the invention relates to an assault ladder for scaling obstacles while breaking through glass windows.

BACKGROUND OF INVENTION

Tactical assault units such as police units and other first responders such as firefighters often are confronted with elevated obstacles including glass barriers/windows that need to be traversed safely and efficiently. For example, in performing an assault on a bus, there is a handicap in the ability to engage targets from outside. While teams breach from a primary entry point (door), time lapses until they can clear and get to the rear. This delay can cost lives. Traditional tactics include standing on the back of another member of the unit as a ramp to elevate to the window level. Alternatively, traditional ladders are able to be used. However, often these traditional ladders lack the support or the attachments to properly break through glass and secure to the window frame.

SUMMARY OF THE INVENTION

Embodiments of the present application are directed to an assault ladder system, method and device for scaling objects while breaching glass windows. Specifically, the assault ladder system is able to comprise a ladder frame having one or more top grappling hooks for hooking onto a ledge as well as one or more window breaker rods for breaking any glass blocking a path at the top of the ladder. As a result, the assault ladder system, method and device provides the advantage of enabling first responders such as firefighters and police to safely and efficiently both scale obstacles (coupling to the obstacles with the grappling hooks) and breach elevated windows found at the top of the ladder using the breaker rods. For example, it provides the advantage of enabling a responder, by themselves, to get to the level of a bus cabin, break any windows blocking their path and securely hold onto the ledge of the bus. As a result, the responder is able to quickly and safely rescue victims, neutralize attackers and/or otherwise address the situation at the elevated position.

A first aspect of the present application is directed to an assault ladder for scaling an obstacle. The ladder comprises one or more support beams each having a central axis, a top end and a bottom end opposite the top end, one or more hooks each coupled to the top end of one of the support beams, one or more glass-breaking protrusions coupled to and extending from at least one of the hooks, wherein each of the protrusions has a tungsten carbide tip and a plurality of step platforms each coupled along at least one of the support beams at regular intervals. In some embodiments, the glass-breaking protrusions couple to and extend from a portion of the at least one of the hooks that is farthest away from the top end of the support beam coupled to the at least one of the hooks. In some embodiments, the glass-breaking protrusions have an elongated dimension that forms an angle with respect to the central axis of the support beams of between 95 and 115 degrees. In some embodiments, each of the support beams is divided into three portions by a pair of hinges, wherein the pair of binges enable an outer two of the three portions to rotate 180 degrees with respect to an inner one of the three portions. In some embodiments, each of the hooks are square-shaped hooks having a plurality of corners. In some embodiments, an inner surface of each of the hooks has a set of anti-slip ridges to prevent the hooks from slipping off of the obstacle. In some embodiments, the plurality of step platforms all couple to a single one of the support beams in an alternating fashion such that each one of the step platforms extends out from an opposite side of the single one of the support beams than any of the step platforms adjacent to the one of the step platforms. In some embodiments, the step platforms are flat and have a top surface and a bottom surface, wherein the top surface forms a 105 degree angle with the central axis of the support beams and includes an anti-slip tread. In some embodiments, the ladder further comprises one or more feet coupled to the bottom end of one or more of the support beams. In some embodiments, the support beams are made of aluminum and the hooks are made of steel.

A second aspect is directed to a method of assaulting an obstacle having an elevated glass window using an assault ladder. The method comprises moving the assault ladder proximate the elevated obstacle, wherein the ladder comprises one or more support beams each having a central axis, a top end and a bottom end opposite the top end, one or more hooks each coupled to the top end of one of the support beams, one or more glass-breaking protrusions coupled to and extending from at least one of the hooks, wherein each of the protrusions has a tungsten carbide tip and a plurality of step platforms each coupled along at least one of the support beams at regular intervals, breaking the elevated glass window by hitting the window with the tungsten carbide tip of the glass-breaking protrusions and securing the assault ladder to the obstacle by hooking the hooks onto a ledge of the obstacle. In some embodiments, the glass-breaking protrusions couple to and extend from a portion of the at least one of the hooks that is farthest away from the top end of the support beam coupled to the at least one of the hooks. In some embodiments, the glass-breaking protrusions have an elongated dimension that forms an angle with respect to the central axis of the support beams of between 95 and 115 degrees. In some embodiments, each of the support beams is divided into three portions by a pair of hinges that enable an outer two of the three portions to rotate 180 degrees with respect to an inner one of the three portions, the method further comprising rotating the outer two of the three portions about the hinges until all of the three portions are aligned. In some embodiments, each of the hooks are square-shaped hooks having a plurality of corners. In some embodiments, an inner surface of each of the hooks has a set of anti-slip ridges to prevent the hooks from slipping off of the elevated obstacle. In some embodiments, the plurality of step platforms all couple to a single one of the support beams in an alternating fashion such that each one of the step platforms extends out from an opposite side of the single one of the support beams than any of the step platforms adjacent to the one of the step platforms. In some embodiments, the step platforms are flat and have a top surface and a bottom surface, wherein the top surface forms a 105 degree angle with the central axis of the support beams and includes an anti-slip tread. In some embodiments, the method further comprises one or more feet coupled to the bottom end of one or more of the support beams. In some embodiments, the support beams are made of aluminum and the hooks are made of steel.

A third aspect is directed to an assault ladder for scaling an obstacle. The ladder comprises a pair of parallel support beams each having a central axis, a top end and a bottom end opposite the top end, a pair of hooks each coupled to the top end of a separate one of the support beams including a first section that extends away from the top end in a direction parallel with the central axis, a second section coupled to the first section that extends at an angle of 95 to 125 degrees with the central axis and a third section coupled to the first section that extends perpendicular to the second section, a pair of glass-breaking protrusions coupled to and extending from a separate one of the hooks, wherein each of the protrusions has a tungsten carbide tip and an elongated dimension that forms an angle with respect to the central axis of the support beams of 105 degrees, and further wherein each of the glass-breaking protrusions couple to and extend from the third section of the separate one of the hooks and a plurality of step platforms each coupled along at least one of the support beams at regular intervals. In some embodiments, each of the support beams is divided into three portions by a pair of hinges, wherein the pair of hinges enable an outer two of the three portions to rotate 180 degrees with respect to an inner one of the three portions. In some embodiments, each of the hooks are square-shaped hooks having a plurality of corners. In some embodiments, an inner surface of each of the hooks has a set of anti-slip ridges to prevent the hooks from slipping off of the obstacle. In some embodiments, the step platforms are fiat and have a top surface and a bottom surface, wherein the top surface forms a 105 degree angle with the central axis of the support beams and includes an anti-slip tread. In some embodiments, the ladder further comprises one or more feet coupled to the bottom end of one or mere of the support beams. In some embodiments, the support beams are made of aluminum and the hooks are made of steel.

DETAILED DESCRIPTION OF THE PRESENT INVENTION

Embodiments of the application are directed to an assault ladder system, method and device for scaling objects while breaching glass windows. Specifically, the assault ladder system is able to comprise a ladder frame having one or more top grappling hooks for hooking onto a ledge as well as one or more window breaker rods for breaking any glass blocking a path at the top of the ladder. As a result, the assault ladder system, method and device provides the advantage of enabling first responders such as firefighters and police to safely and efficiently both scale obstacles (coupling to the obstacles with the grappling hooks) and breach elevated windows found at the top of the ladder using the breaker rods. For example, it provides the advantage of enabling a responder, by themselves, to get to the level of a bus cabin, break any windows blocking their path and securely hold onto the ledge of the bus. As a result, the responder is able to quickly and safely rescue victims, neutralize attackers and/or otherwise address the situation at the elevated position.

Figure 1A:
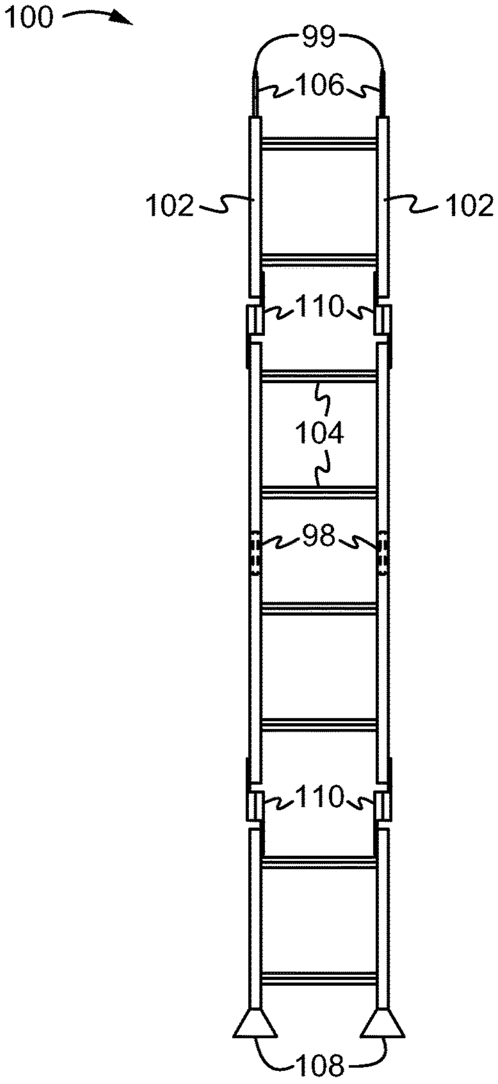
FIG. 1A illustrates a front view of an assault ladder according to some embodiments.
Figure 1B:
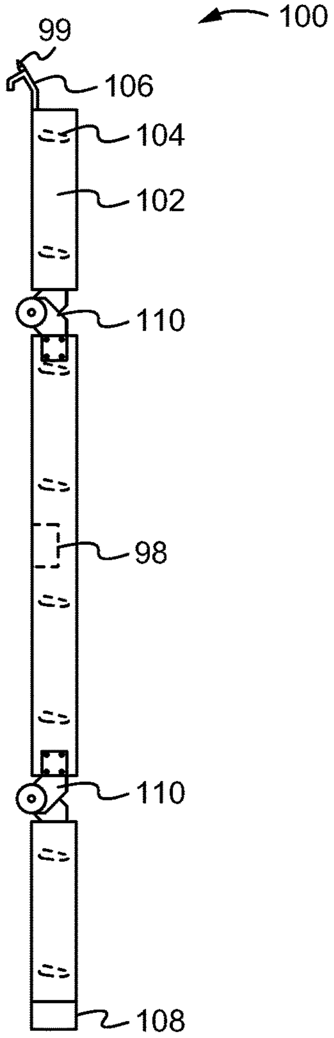
FIG. 1B illustrates a side unfolded view of the assault ladder according to some embodiments.
Figure 1C:
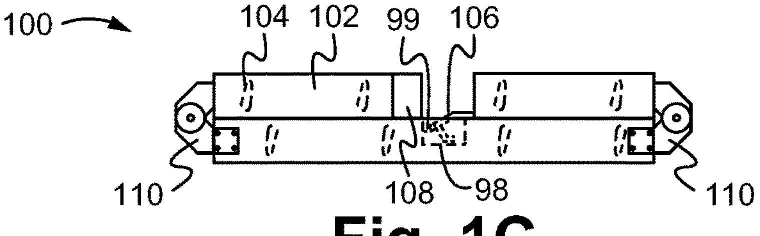
FIG. 1C illustrates a side folded view of the assault ladder according to some embodiments.
Figure 1D:
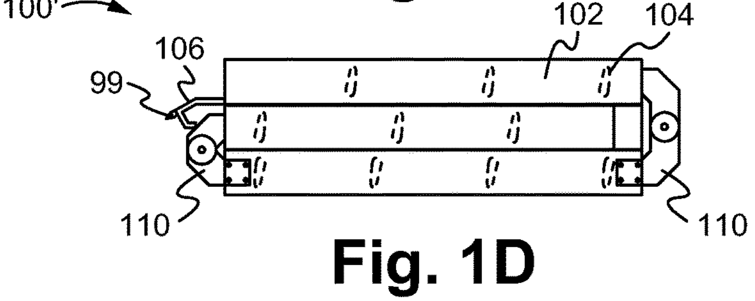
FIG. 1D illustrates a side folded view of the assault ladder having different size joints according to some embodiments.

FIGS. 1A-1D illustrate a front, a side unfolded, a side folded having equal size joints and a side folded having unequal size joints views, respectively, of an assault ladder 100, 100' according to some embodiments. The ladder 100' of FIG. 1D is able to be substantially similar to the ladder 100 of FIGS. 1A-1C except for the differences described herein. As shown in FIGS. 1A and 1B, the assault ladder 100 comprises one or more support beams 102, a plurality of steps/rungs 104 coupled to one or more of the support beams 102, one or more hooks 106 coupled to the top of one or more of the support beams 102, one or more feet 108 coupled to the bottom of one or more of the support beams 102 and one or more glass breakers 99 coupled to and extending from one or more of the hooks 106 and/or beams 102. The beams 102 are all able to be of equal length and the steps 104 are able to be equally spaced along the support beams 102. The feet 108 are able to widen as they extend away from the bottom of the support beams 102 to form a wider base than the support beams 102. Alternatively, or in addition, the feet 108 are able to be coupled together by a horizontal beam (not shown) that extends between the support beams 102.

In some embodiments, the steps 104 are flat and angled with respect to the elongated dimension of the beams 102. Specifically, as shown in FIG. 1B, the flat steps are able to be upwardly angled from a low edge near the back of the beams 102 to a high edge near the front of the beams 102 (e.g., in the direction that the hooks 106 are facing). For example, the angle between the flat steps and the elongated dimension/axis of the beams 102 is able to be between 95 and 115 degrees, such as 105 degrees. This angling is able to cause the flat steps to be substantially parallel with the ground when the ladder 100 is leaned forward against an object (e.g., in order to maximize traction). Further, the upper surface of the steps 104 is able to be non-smooth and/or textured (e.g., via bumps, serrations or other traction increasing methods) in order to increase step traction. In some embodiments, the steps 104 are 12 inches wide, three inches deep and 0.5 inches thick. Alternatively, one or more of the steps 104 are able to be rounded rungs such that regardless of the angle at which the ladder 100 is leaned against an object at least a portion of the rungs 104 will be parallel to the ground. Although as shown in FIGS. 1A and 1B, the assault ladder 100 comprises a first number of support beams 102, steps 104, hooks 106, feet 108 and glass breakers 99, more or less support beams 102, steps 104, hooks 106, feet 108 and/or glass breakers 99 are able to be used.

The support beams 102 are able to be made of aluminum such that they are both strong in order to support the weight of a user as well as light such that the ladder 100 is able to be moved into position easier. Further, each of the support beams 102 are able to comprise one or more rotatable joints 110. Although as shown in FIGS. 1A-1D, the support beams 102 each include two joints 110, more or less joints 110 per beam 102 are able to be used. The rotatable joints 110 divide each beam 102 into a plurality of beam portions and enable each of those portions to rotate with respect to the adjacent beam portion (e.g., the beam portion coupled to the other end of the joint 110). Specifically, the joints 110 are configured to enable the beams 102 to be rotated between an unfolded position (as shown in FIG. 1B) where the adjacent beam portions are aligned, and a folded position (as shown in FIGS. 1C and 1D) where the adjacent beam portions are side by side (or otherwise stacked). In some embodiments, the joints 110 are made of steel. Alternatively, other materials are able to be used.

The joints 110 are able to be "one-way" joints that limit the beam portion's ability to rotate away from the unfolded/straight position to a single direction of rotation (e.g., either clockwise or counterclockwise). In particular, the joints 110 are configured such that the beam portions are only able to rotate away from the unfolded position (as shown in FIG. 1B) in the direction of the front of the ladder 100 (e.g., the direction in which the glass breaker 99 and/or hooks 106 extend away from the beams 102). For example, from the perspective shown in FIGS. 1B and 1C, the upper joints 110 are able to rotate the upper beam portion counter clockwise toward the middle beam portion from the fully unfolded position into the folded position, and the lower joints 110 are able to rotate the lower beam portion clockwise toward the middle beam portion from the fully unfolded position into the folded position. This ensures that the ladder/beams cannot move from the unfolded position into the folded position when the ladder 100 is in use (and is leaning forward onto an obstacle) because the joints 110 cannot fold in that direction. This rotational configuration of the joints 110 relative to the hooks 106 and/or glass breakers 99 is required regardless of the number of joints 110 each beam 102 comprises. In some embodiments, the joints 110 are made of steel. Alternatively, other materials are able to be used.

As shown in FIGS. 1A-1D, when each beam 102 comprises two joints 110 the joints 110 are able to be positioned such that the upper beam portion and the lower beam, portion are equal to or less than one fourth of the total length of the beam 102 (and correspondingly equal to or less than one half of the middle beam portion). Specifically, this joint 110 positioning enables the upper and lower beam portions to be sized such that they can both full fold/rotate to be next to the middle portion as shown in FIG. 1C. Alternatively, the joints 110 are able to be positioned such that each of the sections are equal to or less than a third of the total length of the beam 102 as shown in FIG. 1D. In such embodiments, one of the joints 110 of each of the beams 102 is able to be wider, larger and/or longer than the other joint 110 such that the smaller joint enables the coupled portion of the beam 102 to rotate to be directly adjacent to the central beam portion and the bigger joint 110 subsequently enables the other portion to rotate to sandwich the first portion between it and the central portion (with the bigger joint enabling it to be spaced away from the central portion even when in the folded position as shown in FIG. 1D). In such an embodiment as shown in FIG. 1D, for example, the total length of the beams 102/ladder 100' is able to be 96 inches, with the joints 110 positioned at 32 and 64 inches thereby dividing the beams 102 into three equal portions. Alternatively, other lengths are able to he used wherein the three beam portions are substantially equal in length.

In some embodiments, each of the support beams 102 are able to have a hook channel 98 that extends into the part of the beam 102 adjacent to the hook 106 when the ladder 100 is in the folded position. In particular, the hook channel 98 is able to be sized such that the portion of the hook 106 (and/or glass breaker 99) that extend beyond the side of the beam 102 slide into and fit within the hook channel 98 when the ladder 100 is in the folded position. Alternatively, instead of being coupled to and extending from a top surface of the top of the beams 102, the hooks 106 are able to couple to an outer or inner side surface of the top of the beams 102 (and from there extend upward higher than the top surface of the top of the beams 102 in the same manner as described herein) such that they are vertically offset from the beams 101. In such embodiments, the hook channel 98 is able to be omitted because even in the folded position, the hooks 106 do not run into the beams 102 due to their (inner or outer) offset position. Alternatively, in embodiments as shown in FIG. 1D (or 2D described below), the hook channel 98 is able to be omitted because the substantially equal length of the sections of the beams 102 enables the folding position to be achieved with the hooks 106 extending adjacent to the joint 110 where there is room (not into the adjacent beam section as in FIGS. 1C and 2C). Alternatively, the hooks channels are able to be omitted and the folded position comprises the top section of the beams 102 having the hook 106 folding as much as possible until the hook 106 contacts the section of the beam 102 being folded onto.

The hooks 106 are able to extend from a top (and/or side) surface of the top of the beams 102 via a first vertical portion of the hooks 106 that directly couples to the top (and/or side) surface of the top of the beams 102. This vertical portion is able to extend in a direction substantially parallel to the elongated axis/dimension of the beams 102. The hooks 106 are able to comprise two or wore additional portions that each couple to and extend at a different angle than the previous section. Specifically, as shown in FIG. 1B, a first additional portion is able to couple to the end of the vertical portion and extend at an angle with respect to the vertical portion and/or beam 102 (e.g., between 95 and 105 degrees and/or 105 degrees). A second additional portion is able to couple to the end of the first additional portion and extend at another angle with respect to the first additional portion (e.g. between 80 and 100 degrees and/or 90 degrees) and a third additional portion is able to couple to the end of the second additional portion and extend at another angle with respect to the second additional portion (e.g. again between 80 and 100 degrees and/or 90 degrees). For example, the vertical portion is able to be 6 inches long, the first and second additional portions are able to be 4 inches long and the third additional portion is able to be 2 inches long. Alternatively, one or more of the portions are able to be omitted.

For example, in some embodiments the base vertical portion of the hooks 106 is able to be omitted and the hooks 106 are able to extend from the front side of the beams 102. In such embodiments, with the vertical portion being omitted, the hooks 106 immediately angle away from the beams 102 (e.g., at 105 degrees) via the first additional portions (in the same direction as the elongated dimension of the beams 102). This shorter hook 106 embodiment provides the advantage of moving the top most step 104 closer to the coupling point of the hooks 106 and the obstacle. In some embodiments, the hooks 106 are made of steel. Alternatively, other materials are able to be used. For example, in some embodiments the glass breaker 99 and the hooks 106 are able to be combined such that some or all of the hooks 106 are able to be made of a glass breaking material (e.g., tungsten carbide) and/or the sharp corners of the hooks 106 are able to form the glass breaking lip/glass breaker 99.

In some embodiments, the hooks 106 are square hooks such that one or more of the portions forms a sharp outer and/or inner corner as it abuts the adjacent portion. As a result, these sharp outer corners are able to aid in the breaking of glass when the ladder 100 is in use and/or the sharp inner corners are able to prevent the obstacle from slipping within the hook 106 when coupled thereto. Alternatively, the points of abutment between the portions are able to be rounded. In any case, in some embodiments the inner surface of the hooks 106 is able to be serrated, jagged and/or otherwise textured to prevent the obstacle from sliding within the inside of the hooks 106.

The glass breakers 99 are able to be entirely or partially made of a glass breaking material (e.g., tungsten carbide). For example, a base section of the glass breakers 99 that couples to and extends from the hooks 106 is able to be steel, aluminum, or other rigid material and an outer rounded or sharp tip opposite of the glass breakers 99, opposite where the breaker 99 couples to the hook 106, is able to be made of the glass breaking material. Alternatively, both the base section and the lip are able to be made of the glass breaking material. The glass breakers 99 are able to extend from an outer surface of the hooks 106 (e.g., opposite the surface within the hooks) at an angle with the respect to the elongated axis of the beam 102 (and/or the vertical portion of the hook 106). In some embodiments, the glass breakers 99 form an angle of between 95 and 115 degrees (e.g., 105 degrees) with the elongated axis of the beam 102 in the direction of their tip as the extend from (e.g., second or third additional portions of) the hook 106. As a result of this angle, the glass breakers 99 are able to be substantially parallel with a flat ground (protruding forward) when the ladder 100 is leaned against/toward an obstacle at substantially a 75 degree angle.

In some embodiments, the body of the glass breakers 99 forms a rod or cylinder with a pointed or rounded tip. Alternatively, the glass breakers 99 form a triangle or pyramid with a pointed or rounded tip. In some embodiments, the glass breakers 99 are able to extend 0.5 inches from the hook 106. Alternatively, the glass breakers 99 are able to extend more or less than 0.5 inches from the hook 106. In some embodiment, one or more of the glass breakers 99 extend from the top of one or more of the support beams 102 instead of a hook 106. In any case, the glass breakers 99 provide the advantage of enabling a user of the ladder 100 to use the breakers 99 as a first point of force/contact with and mesas to break glass windows or other glass obstacles such that the ladder 100 is able to hook onto the obstacle through the broken glass.

Figure 2A:
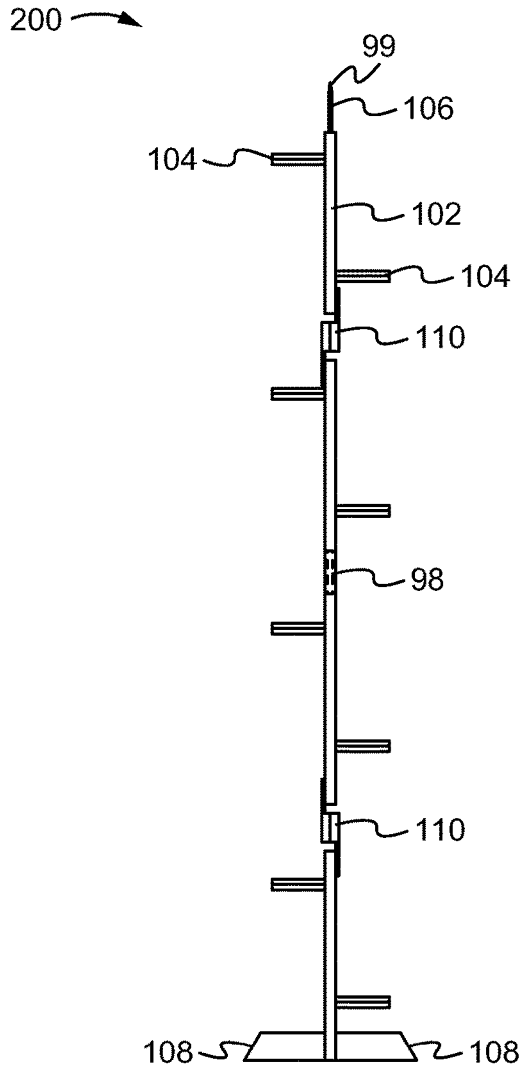
FIG. 2A illustrates a front view of an assault ladder with a single support beam according to some embodiments.
Figure 2B:
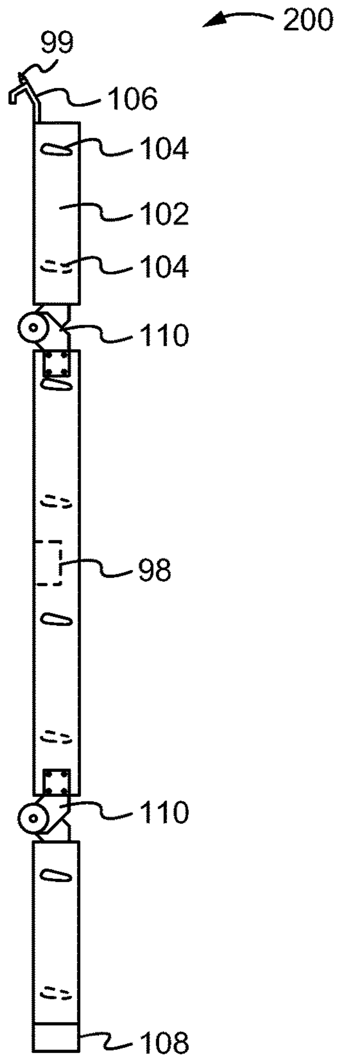
FIG. 2B illustrates a side unfolded view of the assault ladder with a single support beam according to some embodiments.
Figure 2C:
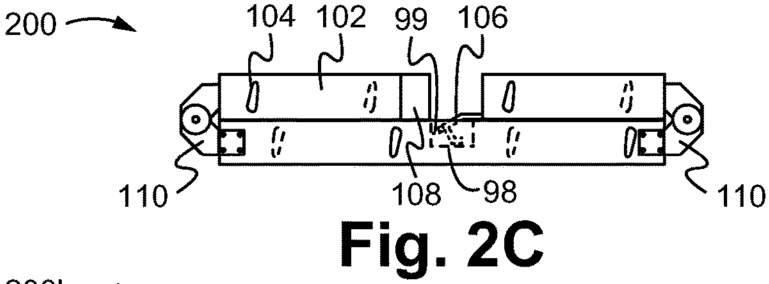
FIG. 2C illustrates a side folded view of the assault ladder with a single support beam according to some embodiments.
Figure 2D:
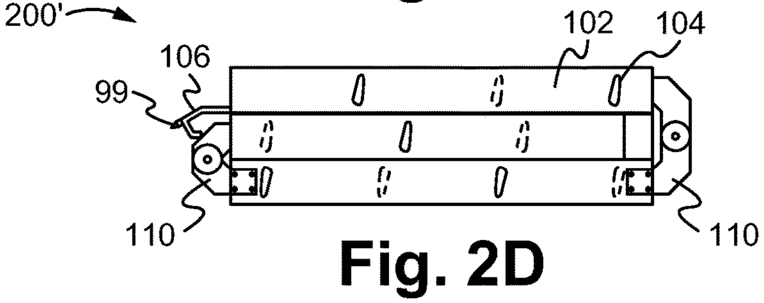
FIG. 2D illustrates a side folded view of the assault ladder with a single support beam having different size joints according to some embodiments.

FIGS. 2A-2D illustrate from, side unfolded having equal size joints, side folded having equal size joints and side folded having unequal size joints views, respectively, of an assault ladder 200, 200' having a single support beam 102 according to some embodiments. The assault ladder 200, 200' of FIGS. 2A-2D is able to be substantially similar to the assault ladder 100, 100' except for the differences described and illustrated herein. Similarly, the ladder 200' of FIG. 2D is able to be substantially similar to the ladder 200 of FIGS. 2A-2C except for the differences described herein. As shown in FIGS. 2A-2D, unlike the assault ladder 100, 100', the assault ladder 200, 200' is able to utilize a single central support beam 102, with each of the steps 104 extending from just one side of the single central support beam 102 and alternating from which side they extend along the length of the beam 102. Alternatively, every step 104 is able to extend from both sides of the single support beam 102. In some embodiments, as shown in FIG. 2A, the feet 108 of the ladder 200 are able to extend horizontally away from the sides of the bottom of the support beam 102. As a result, the feet 108 are able to create a wider more stable base for the ladder 200, 200' to contact the ground while in use. In any case, due to the minimized use of support beams 102 and/or steps 104, the assault ladder 200, 200' provides the benefit of minimizing its weight and size making it easier to move into place and utilize to assault and scale obstacles having elevated windows.

Figure 3:
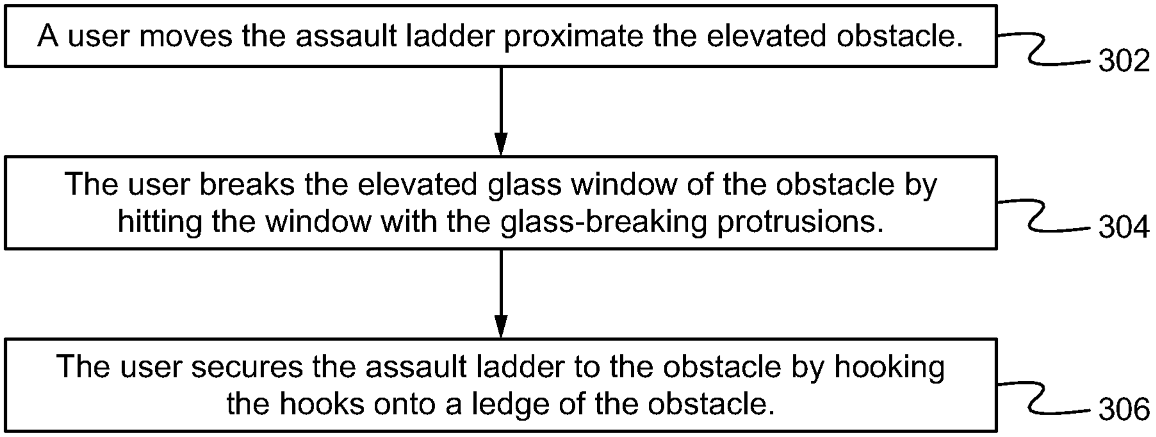
FIG. 3 illustrates a method of using an assault ladder according to some embodiments.

FIG. 3 illustrates a method of assaulting an obstacle having an elevated glass window using an assault ladder 100 according to some embodiments. As shown in FIG. 3, a user moves the assault ladder proximate the elevated obstacle at the step 302. The user breaks the elevated glass window of the obstacle by hitting the window with the glass-breaking protrusions 99 at the step 304. The user secures the assault ladder to the obstacle by hooking the hooks 106 onto a ledge of the obstacle at the step 306. In some embodiments, the user unfolds the assault ladder before steps 304 and 306 by rotating the outer two of the three portions of the ladder about the hinges/joints 110 until all of the three portions are aligned and the ladder is straightened in an unfolded position. In such embodiments, the user is able to re-fold the assault ladder after steps 304 and 306 by rotating the outer two of the three portions of the ladder about the hinges/joints 110 until the portions are adjacent and/or parallel to the central portion (e.g., with the hooks 106 slid into the hook channels 98) and the ladder is fully folded.

Thus, it is clear that the assault ladder system, method, and device described herein has numerous advantages. Specifically, the assault ladder system, method and device provides the advantage of enabling first responders such as firefighters and police to safely and efficiently both scale obstacles and breach elevated windows found at the top of the ladder. For example, it provides the advantage of enabling a responder, by themselves, to get to the level of a bus cabin, break any windows blocking their path and securely hold onto the ledge of the bus. As a result, the responder is able to quickly and safely rescue victims, neutralize attackers and/or otherwise address the situation at the elevated position.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications are able to be made in the embodiment chosen for illustration without departing from the spirit and scope of the invention. For example, although angles ranging from 95 to 115 (e.g. 105) degrees are described herein as they relate to being parallel with the ground with a 4 to 1 ladder base distance to height distance desired ratio when the ladder is leaned against an obstacle, other angles representing parallel with (a hypothetical flat) ground when leaned are able to be used if other distance to height ratios are desired.

What is claimed is:

1. An assault ladder for scaling an obstacle, the ladder comprising:

a pair of parallel support beams each having a central axis, a top end and a bottom end opposite the top end;

a pair of hooks each coupled to the top end of a separate one of the support beams including a first section that extends away from the top end in a direction parallel with the central axis, a second section coupled to the first section that extends at an angle of 95 to 125 degrees with the central axis and a third section coupled to the first section that extends perpendicular to the second section;

a pair of glass-breaking protrusions coupled to and extending from a separate one of the hooks, wherein each of the protrusions has a tungsten carbide tip and an elongated dimension that forms an angle with respect to the central axis of the support beams of 105 degrees, and further wherein each of the glass-breaking protrusions couple to and extend from the third section of the separate one of the hooks; and a plurality of step platforms each coupled along at least one of the support beams at regular intervals.

2. The ladder of claim 1, wherein each of the support beams is divided into three portions by a pair of hinges, wherein the pair of binges enable an outer two of the three portions to rotate 180 degrees with respect to an inner one of the three portions.

3. The ladder of claim 2, wherein each of the hooks are square-shaped hooks having a plurality of corners.

4. The ladder of claim 3, wherein an inner surface of each of the hooks has a set of anti-slip ridges to prevent the hooks from slipping off of the obstacle.

5. The ladder of claim 4, wherein the step platforms are flat and have a top surface and a bottom surface, wherein the top surface forms a 105 degree angle with the central axis of the support beams and includes an anti-slip tread.

6. The ladder of claim 5, further comprising one or more feet coupled to the bottom end of one or more of the support beams.

7. The ladder of claim 6, wherein the support beams are made of aluminum and the hooks are made of steel.

* * * * *